Figure 1:
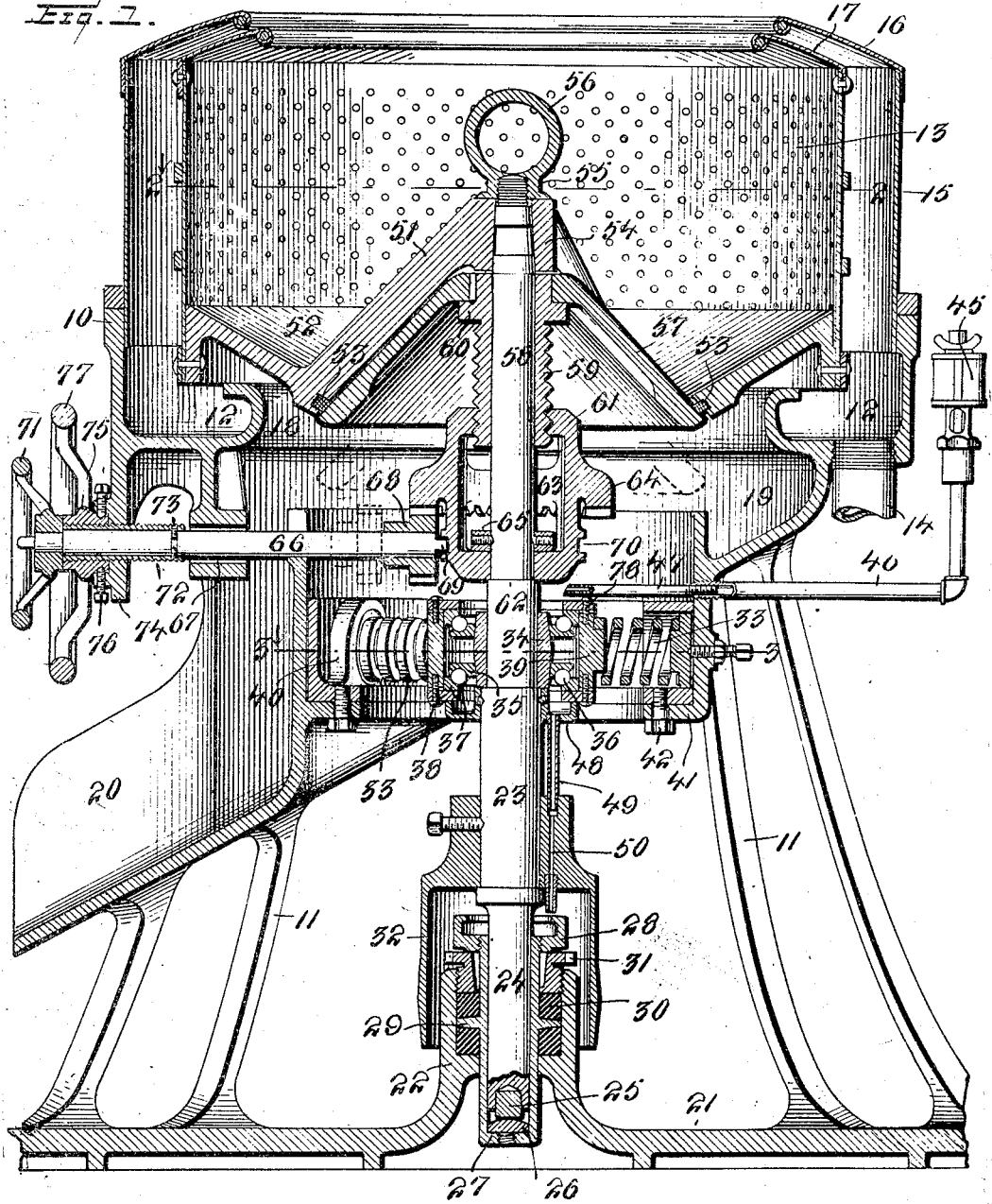

W. BARTHOLOMEW.
CENTRIFUGAL EXTRACTOR.
APPLICATION FILED APR. 1, 1909.

940,662.

Patented Nov. 23, 1909.

2 SHEETS—SHEET 1.

WITNESSES:

INVENTOR
William Bartholomew.
BY E. B. Stocking
Attorney

W. BARTHOLOMEW.
CENTRIFUGAL EXTRACTOR.
APPLICATION FILED APR. 1, 1909.
940,662.
Patented Nov. 23, 1909.
2 SHEETS—SHEET 2.
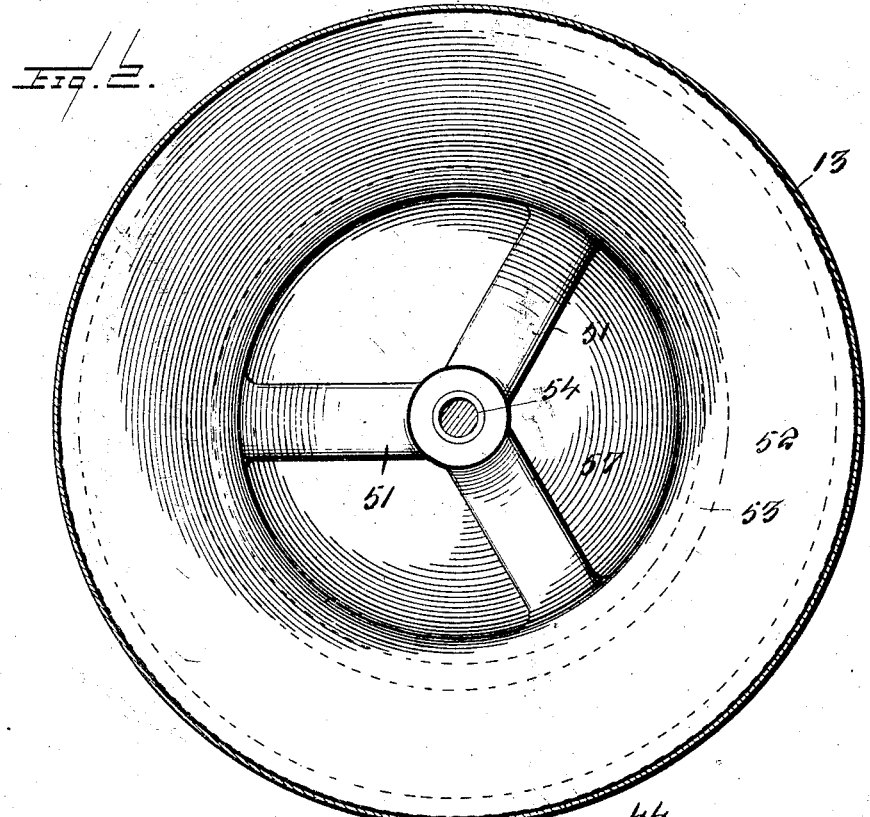
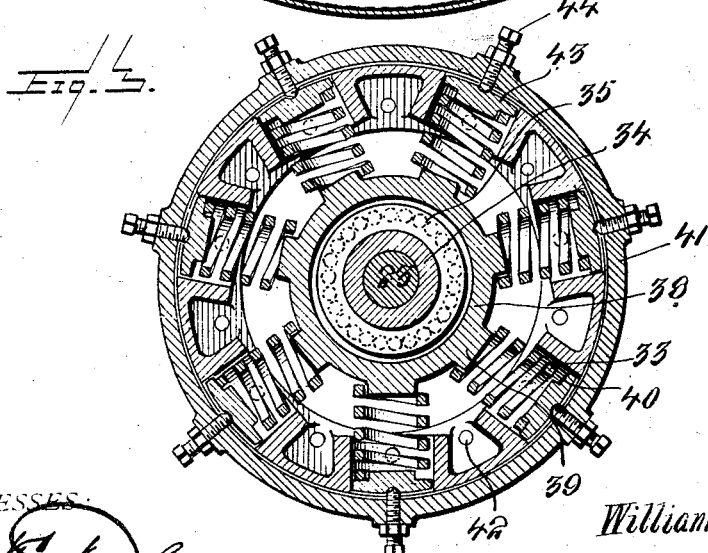
WITNESSES:
INVENTOR
William Bartholomew.
BY
Attorney

UNITED STATES PATENT OFFICE.

WILLIAM BARTHOLOMEW, OF CHICAGO, ILLINOIS, ASSIGNOR TO TROY LAUNDRY MACHINERY COMPANY, LTD., OF CHICAGO, ILLINOIS, A CORPORATION OF NEW YORK.

CENTRIFUGAL EXTRACTOR.

940,662.  Specification of Letters Patent.  Patented Nov. 23, 1909.

Application filed April 1, 1909. Serial No. 487,207.

*To all whom it may concern:*

Be it known that I, WILLIAM BARTHOLOMEW, a citizen of the United States, residing at Chicago, county of Cook, and State of Illinois, have invented certain new and useful Improvements in Centrifugal Extractors, of which the following is a specification, reference being had therein to the accompanying drawing.

This invention relates to a centrifugal extractor, and particularly to means for operating the conical bottom of the basket thereof so as to discharge material therefrom onto a trough.

The invention has for an object to provide a novel and improved construction of means for moving the conical bottom portion of the basket into and out of contact with the driving body thereof, and also to support the driving shaft above its driving pulley to permit a yielding movement thereof in the preliminary rotation of the machine due to the weight of the basket at the upper portion of its driving shaft.

Other and further objects and advantages of the invention will be hereinafter fully set forth and the novel features thereof defined by the appended claims.

In the drawing:—Figure 1 is a vertical section through the extractor; Fig. 2 is a section on line 2—2, Fig. 1; Fig. 3 is a horizontal section on the line 3—3, Fig. 1.

The main frame or body 10 of the extractor may be of any desired construction or configuration and is supported by any preferred form of standards, as shown at 11. This body portion is also provided with a trough 12 to receive the liquid extracted from the reticulated basket 13 and said liquid may be discharged by the pipe 14 from the trough. The body portion comprises the solid casing 15 which extends upward, while the upper portion thereof is inturned, as shown at 16, parallel to the corresponding portion 17 of the basket. The main frame is formed with a central opening 18 disposed above the delivery chute or trough 19 which discharges at one side of the machine, as shown at 20. The base 21 of the machine is provided with a bearing box 22 to receive the lower end of the driving shaft 23. This end 24 of the shaft is provided with a bearing block 25 adapted to rotate upon the removable seat 26 secured at the lower end of the tubular casing 27, the upper portion thereof being provided with an oil cup 28. This casing is provided intermediate of its ends with a circumferential rib 29 disposed between the opposite packings 30 seated within the bearing 22. These packings are compressed by a nut 31 surrounding the casing 27 and threaded into the upper portion of the bearing box 22. By this means the proper tension may be applied upon the packings to resist lateral oscillation of the shaft 23. Secured to the shaft above this bearing box and surrounding the upper portion thereof is a driving pulley 32 to which any desired power may be applied.

For the purpose of supporting the shaft 23 against lateral movement or oscillation in its preliminary rotation a series of compression springs 33 is provided, these being disposed radially of the shaft, as shown in Fig. 3 in order to support the shaft in true vertical position by their mutual resistance to each other. The shaft at this point is provided with a sleeve 34 secured thereto and carrying bearing plates 35 having runways to receive the bearing balls 36 which also travel upon a bearing plate or disk 37 carried by the ring 38 which surrounds the plates 35 and is spaced from the shaft. The plates 37 may be adjusted upon the ring by means of the screws 78 in order to secure the proper bearing for the balls upon the plates. This ring is also provided at intervals with lugs 39 to receive one end of the coil spring which bears thereon. The opposite end of this spring is disposed within a recess in the annular frame 40 which is seated at the lower portion of the bearing casing 41 carried by the standards and secured thereto by means of the bolts 42. Within this recess a bearing plate 43 is mounted and adapted to be adjusted to regulate the compression of the springs by means of the set screw 44 mounted in the outer wall of the casing 41. For the purpose of supplying a lubricant to the bearings herein described a feed receptacle 45 is provided for that purpose and connected by the tube 46 with the casing 41, and from this tube a discharge pipe 47 extends toward the shaft 23 and feeds the lubricant upon the ball bearings within the ring 38. Beneath this ring and secured to the shaft 23 is an oil cup 48 by which the oil is collected and fed through the tube 49 and passage 50 in the driving pulley so as to be discharged into the cup 28 for lubricating the lower end of the driving shaft 23.

The basket 13 is secured to the upper end of the shaft 23 by means of a series of arms 51 extending toward its center, these arms being disposed at the central opening formed by the downwardly inclined bottom 52 of the basket which is also provided with a packing ring 53. The arms are secured to the shaft at 54 and removably held thereon by means of the nut 55 which is provided with an eye 56 to facilitate the ready removal of the nut if it be desired to remove the basket from the shaft for cleansing or other purposes. The basket is provided with a central conical bottom 57 which is slidably mounted upon the upper portion 58 of the shaft 23 by means of the screw 59 which is provided at its upper portion with a securing flange 60 for this conical bottom. The bottom when in the position shown by full lines in Fig. 1 engages the packing 53 and provides a tight bottom for the basket. For the purpose of operating the screw 59 a nut 61 is mounted upon the portion 58 of the shaft and rests at its lower end upon the shoulder 62. This nut is provided with a central opening 63 to receive the screw 59 in its downward feed and also with a peripheral circumferentially extending rack 64 by which it may be driven. The nut is held against vertical movement by means of a set ring 65 secured to the shaft.

For the purpose of operating the nut 61 for moving the conical bottom of the basket a shaft 66 is provided and mounted in a bearing 67 upon the frame 10 for both a reciprocatory and rotary movement therein. The inner end of this shaft has secured thereto a pinion 68 and is also provided with a centering pin 69 adapted to enter a peripheral groove 70 upon the nut and secure a proper alinement of the parts when in driving relation. The outer end of the shaft 66 is provided with a hand wheel 71 by which it may be rotated for operating the screw for controlling the bottom. For the purpose of feeding the shaft into and out of mesh with the rack upon the nut an exteriorly screw threaded sleeve 72 is mounted on the shaft 66 to rotate thereon and held against longitudinal movement by means of set screw 73 entering a groove in said shaft. This screw is supported in a depending flange 74 from the casing 10 in which flange a feed nut 75 is also mounted and held for rotative movement by means of the set screw 76. This nut is provided with a hand wheel 77 to effect a shift of the shaft 66 and its driving gear from the position shown by full lines in Fig. 1 to that shown by dotted lines after the conical bottom has been lowered into the dotted line position or raised to its full line position shown in said figure.

In the operation of the invention when the parts are in the position shown by full lines in Fig. 1 and the basket rotated by the driving shaft the moisture is extracted therefrom by the centrifugal movement and discharged from the trough of the frame. When it is desired to discharge material from this basket the gearing upon the shifting shaft is moved inward into mesh with the rack upon the nut by the hand wheel upon the feed nut for said shaft and this shaft then rotated by its hand wheel to feed downward the conical bottom of the basket into the position shown by dotted lines in Fig. 1 so that the material within the basket is discharged directly into the inclined trough or chute leading from the machine, and the bearings beneath the conical bottom fully protected against moisture or contact with the goods. When it is desired to restore the parts to operative position the feed nut is revolved in the opposite direction and the bottom returned to its full line position into contact with the packing upon the basket by which a tight joint is effected. The gear upon the shifting shaft is then thrown out of mesh with the rack upon the feed nut and the parts are then ready to be driven by power applied to the vertical shaft. The weight of the basket upon this shaft causes it to have a gyratory motion when the speed of rotation is low, and the spring arrangement of the central shaft bearing is such as to maintain this shaft in a vertical position under all conditions and to resist such movement by yielding pressure until the speed of rotation is sufficiently high to maintain the shaft and the basket in proper position by centrifugal force. The bearing for the shaft also permits a lateral yielding thereof while exerting a constant pressure to maintain it in vertical position. The lubricating arrangement provides for lubricating both bearings by a single feed connection. The invention therefore presents a simple, efficient and economically constructed form of extractor in which a bottom delivery is effected and the driving shaft yieldingly supported.

Having described my invention and set forth its merits, what I claim and desire to secure by Letters Patent is:—

1. In a centrifugal extractor, a casing, a driving shaft carrying a basket within the casing, a movable bottom to said basket, screw and nut shifting means beneath said bottom and connected thereto, and a shaft geared to rotate one of said means.

2. In a centrifugal extractor, a casing, a driving shaft carrying a basket within the casing, a movable bottom to said basket, a depending feeding member from said bottom, rotatable shifting means beneath said bottom and meshing with said member, and a shaft geared to rotate said means.

3. In a centrifugal extractor, a casing, a driving shaft carrying a basket within the casing, a movable bottom to said basket, rotatable shifting means beneath said bottom and connected thereto, a shaft geared to rotate said means, and a delivery chute disposed at the periphery of said movable bottom and inclined continuously downward from one side toward a common delivery point.

4. In a centrifugal extractor, a casing, a driving shaft carrying a basket within said casing, a movable bottom to said basket, rotatable shifting means beneath said bottom and connected thereto, a shaft geared to rotate said means, a downwardly inclined delivery chute disposed at the periphery of said movable bottom, and a yielding bearing for said shaft disposed beneath said bottom.

5. In a centrifugal extractor, a casing, a driving shaft, a basket within the casing and secured to the upper portion of said shaft, a central movable bottom provided with a depending screw mounted to move longitudinally on said shaft, a nut rotatably mounted on said shaft and connected to said screw, and means for rotating said nut.

6. In a centrifugal extractor, a casing, a driving shaft, a basket within the casing and secured to the upper portion of said shaft, a central movable bottom provided with a depending screw mounted to move longitudinally on said shaft, a nut rotatably mounted on said shaft and connected to said screw, a shifting shaft provided with a gear to rotate said nut, and means for moving said shaft longitudinally into and out of gear with said nut.

7. In a centrifugal extractor, a casing, a driving shaft, a basket within the casing and secured to the upper portion of said shaft, a central movable bottom provided with a depending screw mounted to move longitudinally on said shaft, a nut rotatably mounted on said shaft and connected to said screw, a shifting shaft provided with a gear to rotate said nut, a feed screw rotatably mounted on said shifting shaft, and a nut engaging said screw and mounted upon the machine frame.

8. In a centrifugal extractor, a casing, a basket disposed therein, a driving shaft for said basket, a centrally disposed movable bottom for said basket, a depending screw carried by said bottom, a nut engaging said screw and provided with a central opening, a peripherally disposed rack carried by said nut, and a shaft having a gear engaging said rack.

9. In a centrifugal extractor, a casing, a basket disposed therein, a driving shaft for said basket, a centrally disposed movable bottom for said basket, a depending screw carried by said bottom, a nut engaging said screw and provided with a central opening, a peripherally disposed rack carried by said nut, a shaft having a gear engaging said rack, a peripherally disposed supporting flange opposite the end of said shifting shaft, and an extension from said shaft entering said flange.

10. In a centrifugal extractor, a casing, a basket disposed therein, a driving shaft for said basket, a centrally disposed movable bottom for said basket, a depending screw carried by said bottom, a nut engaging said screw and provided with a central opening, a peripherally disposed rack carried by said nut, a shaft having a gear engaging said rack, a supporting shoulder for said nut upon said driving shaft, and a set collar secured to said shaft to retain said nut against vertical movement.

11. In a centrifugal extractor, a casing, a basket disposed therein, a driving shaft for said basket, a movable bottom for said basket provided with a depending feed screw, a nut for shifting said screw having a peripheral rack thereon, a shifting shaft provided with a gear meshing with said rack, a feed screw rotatably mounted upon said shaft and held against longitudinal movement thereon, and a feed nut rotatably supported in a fixed member of the machine frame and engaging said screw.

12. In a centrifugal extractor, a casing, a basket disposed therein and having a downwardly inclined bottom, a driving shaft, arms extending from said bottom to the upper end of said shaft, a conical central bottom, and means mounted upon said shaft beneath said bottom for reciprocating it toward and from the basket.

13. In a centrifugal extractor, a casing, a basket mounted therein, a driving shaft supported at its lower end and connected to said basket at its upper end, a bearing disk secured to said shaft intermediate of its ends, an annular ring surrounding said shaft and provided with a coöperating bearing disk, ball members disposed between said disks, and a plurality of yielding devices bearing upon said ring.

14. In a centrifugal extractor, a casing, a basket mounted therein, a driving shaft supported at its lower end and connected to said basket at its upper end, a bearing disk secured to said shaft intermediate of its ends, an annular ring surrounding said shaft and provided with a coöperating bearing disk, ball members disposed between said disks, a plurality of yielding devices bearing upon said ring, and means for adjusting the disk carried by said ring toward and from the shaft disk.

15. In a centrifugal extractor, a casing, a basket mounted therein, a driving shaft supported at its lower end and connected to said basket at its upper end, a bearing disk secured to said shaft intermediate its ends, an annular ring surrounding said shaft and provided with a coöperating bearing disk, ball members disposed between said disks, a plurality of yielding devices bearing upon said ring, and a plate adjustably mounted upon one end of said ring and supporting the bearing disk of the ring.

16. In a centrifugal extractor, a casing, a basket mounted therein, a driving shaft supported at its lower end and connected at its upper end to said basket, a bearing intermediate the ends of said shaft, a relatively fixed annular ring surrounding said bearing, a surrounding annular frame provided with seats, and springs having one end engaging said ring and the opposite end disposed in said seats.

17. In a centrifugal extractor, a casing, a basket mounted therein, a driving shaft supported at its lower end and connected at its upper end to said basket, a bearing intermediate the ends of said shaft, an annular ring surrounding said bearing and provided with a plurality of radially extending lugs, a surrounding annular frame provided with seats, springs having one end embracing said lugs and the opposite end disposed in said seats, a movable plate disposed in said seats, a casing within which said frame is secured, and tension adjusting screws mounted in the wall of said casing to bear upon the plates in said frame.

18. In a centrifugal extractor, a frame having an annular trough at its upper portion, a casing extended upward from said trough, a vertically disposed driving shaft, a basket carried by the upper end of said shaft within said casing, a downwardly movable bottom extending from said shaft to the bottom of said basket, a bearing casing for said shaft disposed beneath said bottom to be covered thereby when the bottom is in its lowered position, and an inclined discharge chute surrounding said bearing casing.

In testimony whereof I affix my signature in presence of two witnesses.

WILLIAM BARTHOLOMEW.

Witnesses:
R. C. RIORDAN,
WILLARD K. CLEMENT.